United States Patent [19]
Bemm

[11] 3,921,858
[45] Nov. 25, 1975

[54] AUTOMATIC CONFECTION DECORATING SYSTEM

[76] Inventor: Robert A. Bemm, 1241 Swainwood Drive, Glenview, Ill. 60025

[22] Filed: Nov. 5, 1973

[21] Appl. No.: 412,651

[52] U.S. Cl. .......... 222/146 HE; 222/389; 222/397; 401/171; 401/188
[51] Int. Cl.² ...................... B67D 5/42; B67D 5/54
[58] Field of Search ..... 222/389, 146 HE, 397, 399; 401/171, 188, 110

[56] References Cited
UNITED STATES PATENTS

| | | | |
|---|---|---|---|
| 1,248,526 | 12/1917 | Morse | 222/389 |
| 1,812,643 | 6/1931 | Albertine | 222/389 |
| 2,615,598 | 10/1952 | Watkins | 222/389 |
| 3,208,643 | 9/1965 | Phillips | 222/389 |
| 3,439,839 | 4/1969 | Schumann | 222/389 |
| 3,551,640 | 12/1970 | Duke | 222/146 HE |
| 3,632,021 | 1/1972 | MacManus | 222/95 |

*Primary Examiner*—Robert B. Reeves
*Assistant Examiner*—David A. Scherbel
*Attorney, Agent, or Firm*—Wolfe, Hubbard, Leydig, Voit & Osann, Ltd.

[57] ABSTRACT

Apparatus for decoratively applying edible pastes to confections and bakery products. The apparatus includes an elongated flexible tube which defines a pressure chamber for containing a quantity of paste to be applied. A nozzle of suitable design is secured at one end of the tube and the other end of the tube is connected to an air pressure supply source whereby pressurized air supplied to the interior of said tube directly forces the extrusion of paste out the discharge nozzle. Alternative selectively operable control valves are disclosed for regulating the discharge of paste from the nozzle.

11 Claims, 8 Drawing Figures

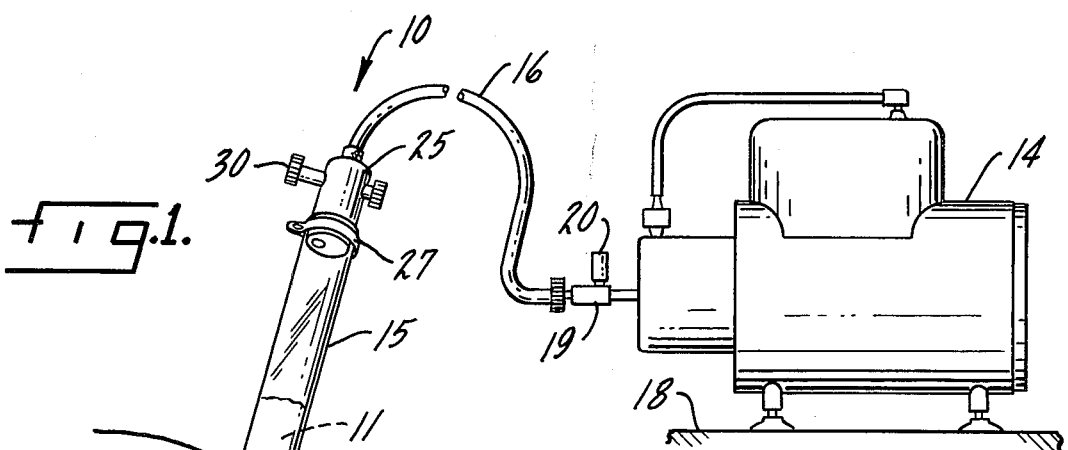
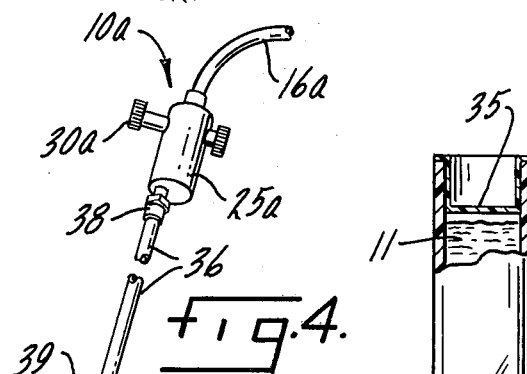
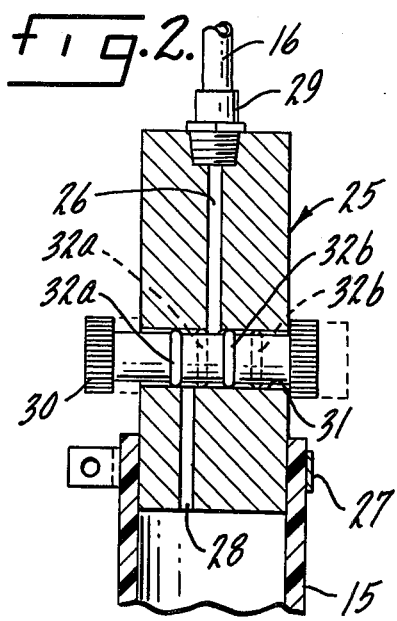

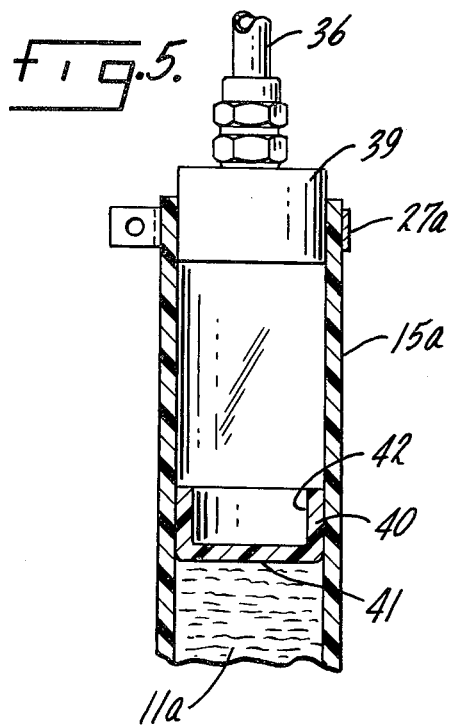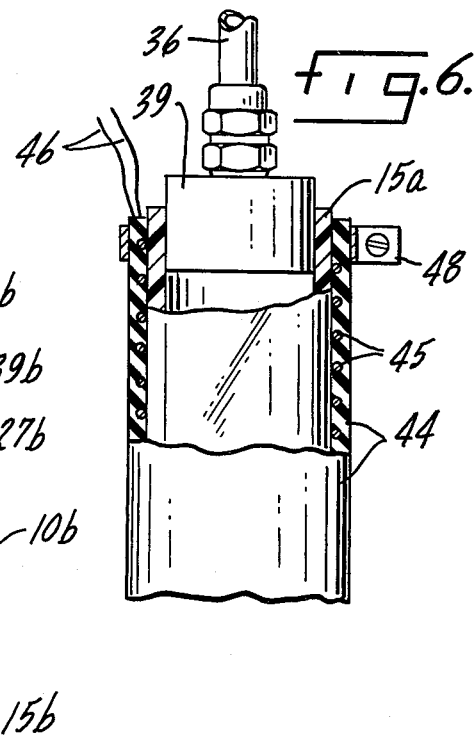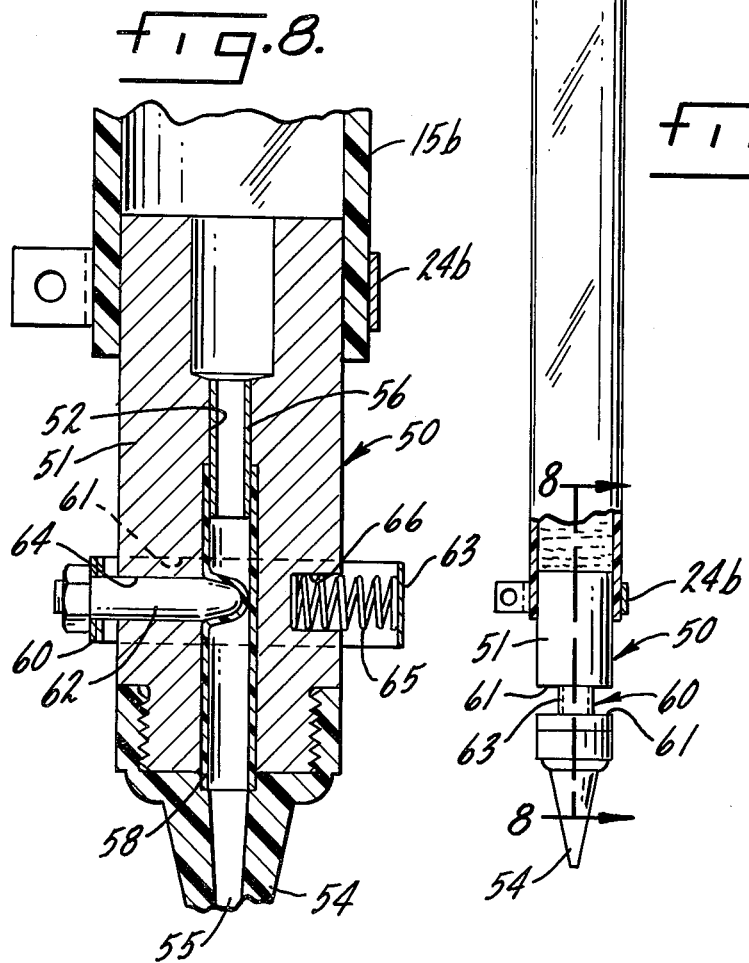

AUTOMATIC CONFECTION DECORATING SYSTEM

DESCRIPTION OF THE INVENTION

The present invention relates to an improved method and apparatus for decoratively applying edible pastes to confections, cakes, pastries, and like food products.

Heretofore, several different methods have been employed in applying pastes, such as icings or confections, to cakes and other food products. Each of these methods, however, has had certain undesirable drawbacks. One of the oldest and still most common means used both in the commercial baking and confection industry and in homes involves the use of a paper or canvas cone which is filled with the icing or confection to be applied. A discharge nozzle, often having decorative flutes, is mounted on the apex end of the cone. When the baker wishes to dispense the decorative icing from the cone, he holds the discharge nozzle above the cake with one hand and squeezes or twists the flexible cone with the other, thus discharging the confection through the nozzle and onto the cake. By moving the hand holding the discharge nozzle, he is able to write on the cake, or alternatively, to form decorative additions to the cake, such as flowers, borders or the like. When such squeezable and twistable cones are used for extended periods of time as, for example, in commercial bakeries, the work becomes extremely tedious and tiresome. The physical effort in twisting such cones also increases the difficulty in achieving fine workmanship.

In an attempt to overcome the disadvantages of the hand operated cone dispensers, certain power paste guns have been developed. One form of such a gun includes a cylinder and plunger arrangement wherein means operate the plunger to force paste out a discharge end of the gun. Another form of paste gun utilizes a housing having a collapsible tube which contains the paste to be discharged. Means are provided in this type of gun for imparting pressure to the exterior of the flexible package to crush the package, thereby dispensing its content through an output nozzle. The capacity of this type of device is greatly limited by the size of the bag that can be effectively crushed, as well as by the physical size and weight of the gun. Both of the above types of paste guns also are heavy and expensive, and are frequently complicated to use, clean, and maintain. In commercial baking operations, when such heavy guns are used for prolonged periods, especially by elderly women who frequently decorate cakes, they become burdensome and fatiguing to the user.

It is an object of the present invention to provide an improved method and apparatus for easily and rapidly applying decorative pastes to bakery products, confections, and the like.

Another object is to provide a paste dispensing apparatus of the above kind which is adapted for delicate writing and design work.

A further object is to provide such a paste dispensing apparatus which is of simple construction, and thus, is susceptible of economical manufacture. A related object is to provide an apparatus of the above kind that is light in weight, and may be easily used, cleaned and maintained.

An object also is to provide a paste dispensing apparatus as characterized above which is capable of dispensing relatively large quantities of paste without refill.

Still another object is to provide an apparatus of the foregoing type which is readily convertible to facilitate the application of different colors or kinds of pastes.

Yet another object is to provide such a paste dispensing apparatus that is adapted to extrude molten chocolate.

Other objects and advantages of the invention will become apparent as the following description proceeds, taken with the accompanying drawings, wherein:

FIG. 1 is a plane view of a paste dispensing apparatus embodying the present invention, shown being used by an operator to decorate a confection;

FIG. 2 is an enlarged fragmentary section of the control valve for the apparatus shown in FIG. 1;

FIG. 3 is an enlarged plane view of a typical paste containing tube capped for storage;

FIG. 4 is a fragmentary perspective of a modified form of apparatus embodying the invention;

FIG. 5 is an enlarged fragmentary section of the upstream end of the paste containing tube of FIG. 3, but showing the addition of a tube cleaning plug contained therein;

FIG. 6 is an enlarged fragmentary section of one end of the paste containing tube shown in FIG. 3, but with the addition of a heating sleeve;

FIG. 7 is a plane view, partially sectioned, of still another embodiment of the present invention;

FIG. 8 is an enlarged fragmentary section taken of the plane of line 8—8 in FIG. 7.

While the invention is susceptible of various modifications and alternative constructions, certain illustrative embodiments have been shown in the drawings and will be described below in detail. It should be understood, however, that there is not intention to limit the invention to the specific forms disclosed, but, on the contrary, the intention is to cover all modifications, alternative constructions, and equivalents falling within the spirit and scope of the invention.

Referring more particularly to FIG. 1 of the drawings, there is shown an illustrative paste dispensing apparatus 10 embodying the present invention which is being used by an operator to decoratively apply an edible paste 11 to a typical confection 12. The apparatus includes an air compressor 14, a paste containing tube 15, and a flexible line 16 connecting the air compressor 14 to the tube 15. The air compressor 14, which is located at a remote station or platform 18, may be of any conventional type capable of developing and maintaining an output air pressure within predetermined limits. In a typical system, the pump preferably has a capacity to develop and maintain an output pressure of between 25 and 30 p.s.i. Such pumps, as is well known in the art, may employ pressure switch means for automatically energizing the compressor when its output pressure falls below the lower limit, such as 25 p.s.i., and automatically de-energizing the compressor when the pressure again is raised to the upper limit, such as 30 p.s.i.

To cause a relatively smaller pressure to exist in the line 16 downstream of the pump 14, an air control valve 19 is provided at the output end of the compressor. The air control valve may be of a known type which restricts the output air flow from the pump and thereby causes a lower pressure to be maintained in the downstream line 16. The air control valve 19 in this case has a rotatable dial 20 that permits selective adjustment of the air flow through the valve. Alternatively, or in the event that a higher capacity compressor is used so that a more significant pressure drop must be effected, a pressure regulator may be used in lieu of the air flow control valve 19. In either case, the combination of the compressor 14 and air flow control valve 20 or pressure regulator preferably should effect and maintain relatively low air pressure in the line 16, preferably less than 15 p.s.i.

In accordance with the present invention, the tube defines an internal pressure chamber for containing a quantity of paste to be dispensed and a discharge nozzle is provided at one end of the chamber and the pressurized air supply connected at the other end whereby internal pressure within the chamber directly forces paste out the discharge nozzle in the desired form. In the illustrative embodiment, the tube 15 is an elongated flexible cylindrical member within which the paste 11 to be dispensed is placed. The tube preferably may be made of a transparent plastic material, such as polyvinyl chloride, so that the color and type of confection within the tube may be easily observed by the user. Alternatively, the tube could be made of other plastic or metal materials that are compatible with the edible pastes to be dispensed.

A removable and replaceable nozzle 21 is secured at the downstream end of the tube 15. The nozzle 21 in this case is formed with a protruding conical end portion and an upper cylindrical portion that is received in the end of the tube 15. To secure the nozzle in position, a screw-clamp 24 placed on the end of the tube 15 may be tightened to clamp the tube against the cylindrical nozzle portion. The nozzle 21 may be formed with various types of output passages or flutes to impart the desired decorative or thickness characteristic to the paste as it is extruded.

To connect the air pressure line 16 to the tube 15 and to regulate the flow of pressurized air into the tube, a selectively operable control valve 25 is provided. The illustrated valve 25, as shown in detail in FIG. 2, is in the form of a cylindrical hub formed with an inlet port 26 and an outlet port 28. The valve 25 fits snugly within the end of the tube, and is secured in place by a screw-clamp fastener 27. A threaded connector 29 couples the flexible line 16 to the inlet port 26. To regulate the passage of air from the inlet port 26 through the outlet port 28, and thus into the interior of the tube 15, a manually operable valve member 30 is supported for sliding movement in a transverse opening 31 that intersects the two ports 26, 28. The valve member 30 has a diameter slightly less than the transverse opening 31 within which is supported, and a pair of space sealing rings 32a, 32b are secured to the valve member for movement with it. The valve member when in "on" position, as shown in solid lines in FIG. 2, permits the passage of pressurized air through the inlet port 26, around the valve member 30, and out the outlet port 28 into the interior of the tube 15. In such position, the sealing rings 32a, 32b, prevent the escape of air laterally out the hub opening 31.

In keeping with the invention, the valve member 30 is selectively movable to an "off" position, shown in phantom in FIG. 2, for interrupting the flow of pressurized air from the inlet port 26 to the outlet port 28 and simultaneously venting the interior of the tube 15 to atmospheric pressur. When the valve member 30 is in the "off" position, the sealing ring 32a is moved to a position between the inlet and outlet ports 26, 28 so that pressurized air is maintained between the sealing rings 32a, 32b and cannot escape through the outlet port 28 or the opening 31. In such position, the interior of the tube 15 will automatically vent to atmosphere through the outlet port 28 and the space between the valve member 30 and opening 31 to relieve any pressure buildup that may exist in the tube.

To prepare the dispensing apparatus for use, the control valve 25 may be removed from the end of the tube 15 so that the tube may be filled, or refilled, with the desired paste that is to be applied to the confection 12. The control valve 25 may then be repositioned within the end of the tube. It will be appreciated that a number of such tube 15 could be filled with different types or colors of paste prior to usuage. To permit storage of such tubes, either before or after usage, a removable plug 35 may be positioned within the end of the tube, as shown in FIG. 4, to substantially seal its contents. The nozzle 21 in such case would remain secured at the other end. When a particular color or type of paste is required, that tube 15 may be taken from storage, uncapped, and positioned onto the control valve 25.

In operation of the apparatus 10, it will be seen that upon actuation of the air compresor 14 the air control valve 19 may be adjusted to maintain a predetermined relatively small pressure in the line 16, preferably in the range of 5 to 10 p.s.i. The control valve member 30 when in its "off" position, shown in phantom in FIG. 2, blocks the flow of air from the line 16 into the interior of the tube 15. The tube 15 can be held in one hand by the worker, as shown in FIG. 1, and when the worker is ready to commence decorating the confection 12, with his other hand he can manually move the valve member 30 to its open position, shown in solid lines in FIG. 2, which permits the flow of pressurized air from the inlet port 26, about the valve member 30, and out the outlet port 28 into the interior of the tube 15. The resulting pressure buildup in the upper end of the internal chamber defined by the tube 15 acts directly on the paste contained therein to force it toward the opposite end of the tube so that it is extruded out the discharge nozzle in a form governed by the characteristics of the particular nozzle. Since the tube 15 preferably is made of relatively light plastic material, it can be seen that it may be manipulated by hand in a pencil-like manner to effect the desired design on the confection. At the same time, the other hand of the operator may operate the control valve member 30 to start and stop the paste extrusion as required. Preferably, the tube is made of sufficiently flexible material that the upper control valve end of the tube may be held stationary while the lower discharge end is manipulated as required to effect the particular design. Because of the automatic venting characteristics of the control valve 25 when the valve member 30 is moved to an "off" position the interior of the tube 15 is quickly and automatically vented to the atmosphere so that extrusion of paste 11 from the discharge nozzle is promptly halted. Without such venting, a pressure buildup within the tube 15, which may cause a slight outward bulging of the tube due to the flexible nature of the plastic material, might continue to force paste out the discharge nozzle for a short time after closing of the valve member, thereby creating undesirable run-out of the paste.

A modified form of the apparatus is shown in FIG. 4, wherein similar parts have been given like reference numerals with the distinguishing suffix a added. In this embodiment, the control valve 25a, which is of similar construction to that shown in the embodiment of FIG. 1, is separated from the end of the paste containing tube 15a by a flexible line 36. The line 36 is secured at one end to the output port of the valve 25a by a threaded coupling 38 and the other end is coupled to the upstream end of the tube 15 by a cylindrical adapter 39 that is snugly inserted into the end of the tube. While the basic operation of the dispensing apparatus 10a is identical to that shown in FIG. 1, the flexible line 36 permits the control valve 25a to be located at a location remote from the dispensing tube 15a. Such an arrangement may enable a worker to more conveniently operate the control valve 25a in one hand while the dispensing tube 15a is in the other. Alternatively, the control valve 25a could be located below a work table and be foot operated so that while the operator uses one hand to hold the paste tube 15a the other hand would be free to hold the confection that is being decorated.

To facilitate the extrusion of substantially all of the paste 11a within the tube 15a, a follower plug 40 may be slidably positioned within the tube, as shown in FIG. 5, between the air inlet end of the tube and the paste. The plug 40 in this case has a circular portion 41 with an upwardly extending cylindrical portion 42 and is slidably positioned within the tube after it has been filled with the paste. When pressurized air is introduced into the tube 15a in such case, the plug 40 tends to be forced downwardly as the paste is extruded, and as a result, causes substantially all of the paste to be forced toward the discharge aperture without leaving an excessive residue on the walls of the tube. Such a plug 40 is particularly useful with relatively long tubes and with tubes whose diameters exceed 1 inch.

In the event that chocolate is to be extruded, it generally is necessary to maintain such material in a warm molten state. For this purpose, a heating sleeve 44 may be positioned over the tube 15a, as shown in FIG. 6. The illustrated heating sleeve 44 may be made of rubber or like material and have electrical heating elements 45 disposed therein which may be connected to a suitable electrical outlet by means of a line 46. To secure the heating sleeve 44 in place on the tube 15a, clamps 48 are provided about each end of the sleeve. When the elements 45 are energized, the sleeve 44, the tube 15a, and the chocolate or other paste contatined within the tube are heated. By suitable thermostatic controls, the temperature of the chocolate may be established for maintaining the proper temper and extrusion characteristics of the chocolate.

Referring now to FIG. 7 and 8, there is shown still another embodiment of the invention wherein similar parts have been given like reference numerals with a distinguishing suffix b added. As shown in FIG. 7, an air inlet line 36b is connected to the upstream end of the tube 15b by an adapter 39b, and at the other end of the tube there is provided a nozzle and valve assembly 50 adapted to regulate the flow of paste from the tube. The assembly 50 includes a hub 51 formed with a central port 52 and a suitable nozzle 54 threaded onto the outer end of the hub 51 having a central port 55 coaxially aligned with the hub port 52. The hub 51 in this case has a metal sleeve 56 fixed centrally within the hub port 52, and telescoped over one end of the sleeve 56 and extending through the remaining length of the hub 51 and into the nozzle 54 is a flexible plastic tube 58.

To control the extrusion of paste through the flexible tube 58, a spring operated valve 60 is mounted on the hub 51 for relative transverse movement. The valve member 60 includes a rectangular bracket 63 surrounding two flat surfaces of the hub formed by relieved areas 61 on its opposite side. Secured to one end of the rectangular bracket 63 is a pin 62 that is received in an aperture 64 extending through one side of the hub to the central port 52. A spring 65 interposed between the opposite end of the bracket and a counter-bore 66 formed in the adjacent area of the hub tends to urge the bracket 63 and pin 62 to the position shown in FIG. 8 whereby the pin crimps the flexible tubing 58 to block the flow of paste through it. By manually moving the bracket 63 against the biasing force of the spring 65, the pin 62 may be removed from the flexible tube 58, permitting the paste to flow through the nozzle 54 under the force of the pressure within the tube. In use of the dispensing apparatus 10b, it is possible for a worker to operate the control valve 60 while holding the lower end of the dispensing tube 15b. This frees the operator's other hand for manipulating the confection when necessary.

From the foregoing, it will be appreciated that the methods of the present invention provides a simple and efficient means for applying edible pastes to confections and bakery products. Basically, the method involves providing a chamber with a paste outlet aperture and an air inlet aperture, placing a supply of paste in the chamber, connecting an air supply means to the outlet aperture, supplying pressurized air into the chamber to force and extrude said paste from the outlet aperture, and controlling the flow of paste from the outlet aperture to facilitate the desired application of paste onto the confection. It can also be seen that the apparatus for carrying out such method is relatively simple and light weight, and thus is particularly well suited for use in commercial bakeries where decorating of pastries and confections is carried on over prolonged periods. The apparatus further may be easily and quickly assembled and dissassembled for cleaning, maintenance, and refilling.

While the invention has been described in connection with several alternative embodiments, it will be appreciated that still other variations of the invention may be utilized. For example, a single large pressurized manifold may be provided for a plurality of dispensing tubes, each of which is connected to the manifold by an individual extensible line and is individually controllable. Each dispensing tube could be filled with a different kind or color of paste and could be located in close relation to a work table so that a worker may readily select the different tubes as needed.

I claim as my invention:

1. An apparatus for decoratively applying pastes to bakery products, confections, and the like comprising an elongated tube defining an elongated air pressure chamber a length of which is pre-filled with a determined quantity of paste, a discharge nozzle at one end of said tube, air pump means, means connecting aid air pump means to the opposite end of said tube for directing air under pressure into said chamber and against one end of the said quantity of paste contained therein for moving said quantity of paste along the length of said tube and extruding a portion thereof out of said discharge nozzle without substantial intermixture of said air and paste, selectively operable valve means for controlling the discharge of said paste from said nozzle under force of said air pressure, and said elongated tube having strength sufficient to withstand said internal pressure without substantial radial deformation while being sufficiently flexible to permit the nozzle end to be moved relative to the opposite end thereof to permit decorative application of said paste from said nozzle while said opposite end is held stationary.

2. The apparatus of claim 1 in which control valve means is at the upstream end of said tube and is selectively operable to regulate the flow of pressurized air into said chamber.

3. The apparatus of claim 2 in which said control valve means includes a valve member that is movable between a position that permits the flow of pressurized air into said chamber and a position that interrupts the flow of pressurized air into said chamber, and said control valve means is operable to automatically vent said chamber to atmospheric pressure upon interruption of said air flow into said chamber.

4. The apparatus of claim 1 in which said control valve means is at the nozzle end of said tube and is selectively operable to interrupt the flow of paste from said nozzle.

5. The apparatus of claim 3 in which said control valve means is interposed between said discharge nozzle and said chamber and is selectively operable to block the flow of paste from said chamber out said discharge nozzle.

6. The apparatus of claim 5 in which said discharge nozzle and control valve means are included in a single assembly that is removably mounted in said tube.

7. The apparatus of claim 1 in which said nozzle and control valve means are removably secured at opposite ends of said tube to permit ready disassembly and cleaning of said tube, and said tube is made of transparent material to permit visual observation of the amount of paste contained therein.

8. The apparatus of claim 4 including a heating sleeve coaxially positioned about said flexible tube, said sleeve having electrical heating elements contained therein which may be energized to heat said sleeve, tube, and the paste contained within said tube.

9. The apparatus of claim 7 including a follower plug of substantially the size of the internal diameter of said tube slidably disposed therein between the air inlet end and said paste whereby pressurized air introduced into said tube causes said follower plug to be forced against said paste.

10. The apparatus of claim 1 in which said control valve means coupled to said tube through an elongated flexible line to permit selective positioning of said tube relative to said control valve means, and said control valve means is selectively operable to interrupt the flow of air from said air pump means to said chamber.

11. The apparatus of claim 1 including a flexible line coupling said air pump to said tube, air flow regulating means at said air pump means for controlling the flow of air to said line, and said control valve means is located at an upstream end of said tube for selectively regulating the flow of air into said container.

* * * * *